June 9, 1959  W. J. SCHIESER ET AL  2,890,013
NET WEIGHING MACHINE

Filed Dec. 16, 1955  7 Sheets-Sheet 1

INVENTORS
Warren J. Schieser
John F. Keely
Newell G. Mitchell
BY
Cerbitt, Mahony & Miller
attys

June 9, 1959　　　W. J. SCHIESER ET AL　　　2,890,013
NET WEIGHING MACHINE

Filed Dec. 16, 1955　　　　　　　　　　　　　7 Sheets-Sheet 6

INVENTORS

Fig 14

United States Patent Office 2,890,013
Patented June 9, 1959

2,890,013

NET WEIGHING MACHINE

Warren J. Schieser, John F. Kelley, and Donald G. Marshall, Columbus, Ohio, assignors to National Industrial Product Company, a corporation of Ohio Application December 16, 1955, Serial No. 553,596

6 Claims. (Cl. 249—16)

Our invention relates to a net weighing machine. It has to do, more specifically, with a machine which will receive material fed automatically from a source of supply, automatically weigh the material and form successive charges therefrom which are of a selected weight, and automatically discharge the charges successively so that they can be used for the purpose for which they are intended.

Various types of net-weighers have been provided in the past and have been used for various purposes where accurately weighed successive charges of material are needed. For example, in recent years, various net-weighers have been used to weigh and feed a predetermined weight charge of plastic molding material to a plastic injection molding machine. However, net-weighers are used for many other purposes.

Our present invention deals mainly with the material receiving weigh hopper or bucket of a net weighing scale and the mechanism for controlling the dumping mechanism or discharge mechanism of the weigh bucket or hopper.

By the term "net-weigher" used herein we intend to cover a weighing machine in which the weighing is accomplished in a bucket or container forming a part of the weighing mechanism and not in a container or package which is removed from the machine with the weighed material therein after the weighing operation is completed.

In the accompanying drawings we have illustrated examples of our net-weigher but it is to be understood that our net-weigher may take other specific forms without departing from the basic principles of our invention. In these drawings:

Figure 6 is a horizontal sectional view taken along line 6—6 of Figure 1 showing the weighing lever and the associated commodity-receiving bucket and dump mechanism.

Figure 1:
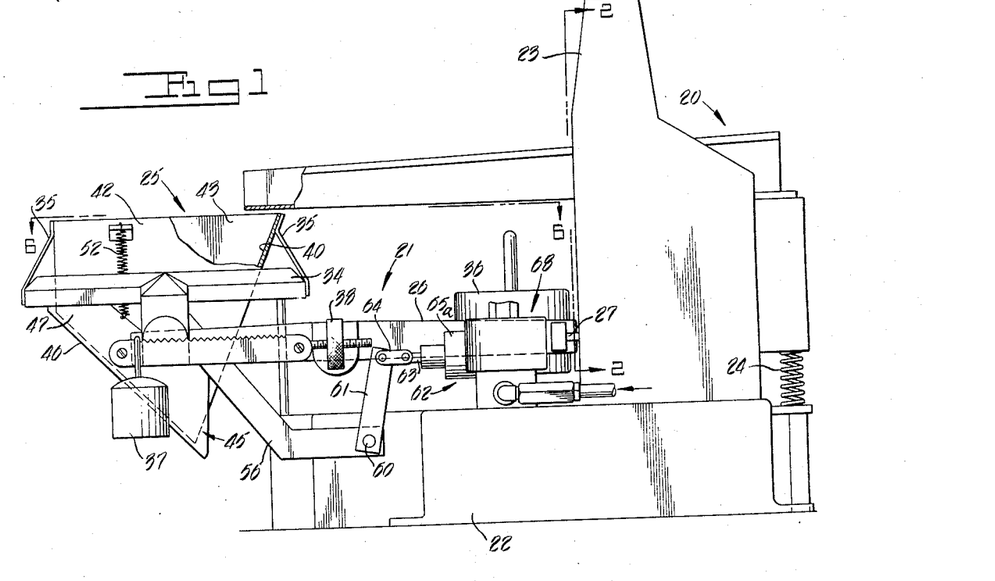
Figure 1 is a side elevational view, partly broken away, of a net-weigher constructed according to our invention.

With reference to the drawings, we have illustrated in Figure 1 a net-weigher which receives material from a vibratory feeder 20 which is of the well-known electromagnetically operated type. However, our net-weigher may receive material from any other suitable feeding mechanism. Associated with the feeder 20 is a scale 21. The scale 21 includes the base 22 and an upstanding indicator tower 23 which is disposed at the right hand end of the base (Figure 1) and the dial of which (not shown) is readable from that end. The vibratory feeder 20 is suitably supported on a base adjacent the scale by means of springs, one of which is shown at 24. The tower 23 is offset forwardly (Figure 1) on the scale base to permit the trough of the feeder 20 to be disposed at a low level so that its discharge end is directly over a weigh bucket 25 which is provided at the end of the scale opposite to that where the tower 23 is disposed.

The scale 21 has fulcrumed on the base thereof a weigh-lever 26 which is shown as being of the one-to-one ratio type but may be of other suitable types. This lever 26 extends behind the indicator tower 23 and has an extension 27 which extends forwardly into the indicator tower 23 and which has flexes 28 associated therewith which normally keep the lever in balanced position. An indicator pointer 29 of the pendulum type is provided for swinging movement in the tower in association with an over-and-under weight dial and is connected to the weigh-lever extension 27 by means of a gravity type push rod 30 of a suitable type.

The weigh bucket 25 is disposed at the commodity end of the weigh-lever 26 and this end of the lever, along with the commodity outrider 34, are of special form so that the bucket can be disposed with its center of gravity low compared to the lever so as to minimize stresses on the outrider bearings and the lever fulcrum bearings as well as the scale check rod structure. It will be noted best from Figure 6 that the right hand end of the lever is in reality a wide yoke 32 which carries pivots 33 on its outer ends that support the outrider 34. This outrider 34 is of substantially rectangular form and the bucket 25 is supported thereby. The bucket 25 is centered within the outrider 34 and the lever yoke 32 and extends downwardly therethrough. The weigh bucket 25 is fastened rigidly to the outrider 34 by means of the brackets 35. This positioning of the bucket 25 at a low level relative to the weigh-lever 26 also permits the vibratory feeder 20 to be at a low level and the offsetting of the tower 23 permits the feeder to be located directly over the weigh-lever 26 thus enhancing the compactness of the entire weigh-feeder and providing for a short drop of material into the bucket from the feeder 20 thereby decreasing strains and stresses on the scale. In the arrangement shown in Figures 1 and 3, the center of gravity of the weigh bucket 25 corresponds with the outrider pivots 33.

The end of the weigh-lever 26 opposite to the bucket-supporting end has the counterbalance weight outrider 36 pivotally mounted thereon for counterbalancing the weight of the bucket 25 and associated parts. The lever 26 also has adjustably mounted on the front thereof a counterpoise weight 37 and a balancing weight 38.

The bucket 25 is of hopper form (Figures 1, 3 and 6) with its inner wall 40 extending at an angle outwardly and downwardly, with its outer wall 41 vertical and with its front and rear walls 42 and 43 vertical. The outer wall 41 is short compared to the inner wall 40 with the result that the lower edges of the connecting front and rear walls 42 and 43 are angled downwardly and inwardly from the outer wall 41 to the inner wall 40. The result is that material discharged from the bucket 25 will be directed outwardly away from the scale.

For closing the lower outwardly directed open end of the bucket 25 we provide a gate 45. This gate is trough-shaped and is mounted for vertical swinging movement from closed position, in straddling relationship to the lower portions of the front and rear walls 42 and 43 as shown by the full lines in Figure 3, to open position or dumping position where it is swung outwardly away from the lower angled edges of the walls 42 and 43, as shown by the dotted lines in Figure 3.

As indicated, the gate 45 is trough-shaped having the flat bottom 46 (Figures 3 and 6) and the upstanding sides 47 and 48. The sides 47 and 48 are provided at their upper and outer corners with upwardly opening notches 49 which cooperate with trunnion pins 50 mounted on the front and rear walls 42 and 43 of the bucket 25. This notches-and-pins pivot arrangement makes it possible to adjust the gate relative to the pins 50 and the gate is fixed in position relative to the pins by the clamping nut units 51 mounted on the pins 50. The gate 45 is normally held in its uppermost or bucket-closing position against the lower inclined edge of the bucket by means of tension springs 52 which have their lower ends anchored to the sides 47 and 48 of the scoop gate 45 and their upper ends anchored to the front and rear walls 42 and 43 of the bucket. It will be noted that the springs are connected to the upper edges of the sides 47 and 48 of the scoop gate at points about midway of the length thereof. Ahead of these connections the sides 47 and 48 have the arcuate shaped cam-edges 53 and 54 formed respectively thereon.

For opening and closing the gate 45, we provide the operating mechanism shown in Figures 1, 3, 5 and 6. An important feature of our net-weigher is that none of this operating mechanism is carried by live elements of the scale and, therefore, the gate-operating mechanism has no deleterious effect on the scale during the weighing operation and does not interfere with the accuracy of such operation. This operating mechanism only engages the gate when it is desired to move it into dumping position.

Figure 3:
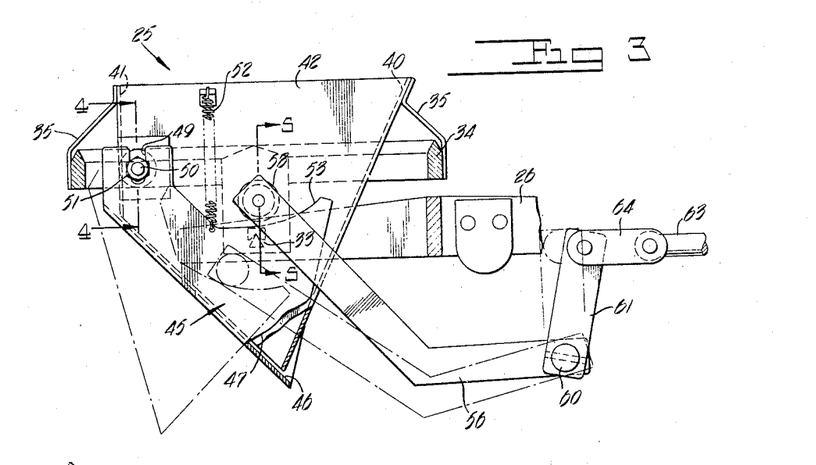
Figure 3 is a vertical sectional view taken along line 3—3 of Figure 6 showing one form of the dump-gate operating mechanisms used on our net-weigher.
Figure 4:
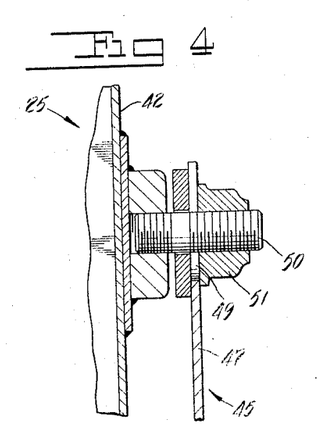
Figure 4 is a detail in vertical section taken along line 4—4 of Figure 3 showing the dump-gate pivot.
Figure 5:
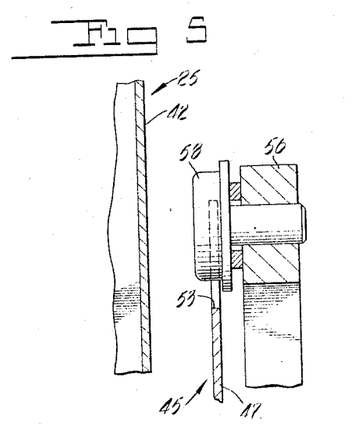
Figure 5 is a detail in vertical section taken along line 5—5 of Figure 3 and showing the end of one of the dump-gate operating arms.

This operating mechanism comprises a pair of operating arms 56 and 57 provided at the front and rear of the bucket 25 and having the cam-engaging rollers 58 and 59 which are adapted to engage the respective cam edges 53 and 54 of the gate 45 as shown best in Figure 6. These rollers 58 and 59 are normally spaced above the cam edges 53 and 54 a sufficient distance to permit the necessary vertical movement of the bucket 25 with weigh-lever 26 during the weighing operation, as indicated in Figure 3 where the roller 58 is shown spaced above the cam edge 53. The arms 56 and 57 project downwardly between the respective sides 42 and 43 of the bucket and the outrider 34 and laterally of the bucket and have their ends keyed on a rock-shaft 60 (Figures 1 and 6) which extends forwardly and rearwardly beneath the weigh-lever 26. This rock-shaft is rocked by means of a rock-arm 61 keyed on the forward end thereof.

The rock-arm 61 is rocked at the proper periods by means of an air-operated cylinder and piston unit 62 (Figures 1, 10 and 11) which is carried on the base 22 of the scale as shown in Figure 1. The piston rod 63 of this unit is connected to the upper end of the rock-arm 61 by means of a link 64. The piston 65 of this unit is normally urged to the right by means of a compression spring 66 provided in the cylinder 65a. In this position of the piston 65, the cam rollers 58 and 59 on the operating arms 56 and 57 will not engage the cam edges 53 and 54 on the gate 45. For moving the piston to the left against the resistance of the spring 66, air is supplied to the right hand end of the cylinder 65a of the unit 62 by means of a line 67 which is controlled by an electromagnetically operated air valve 68.

The valve 68 (Figures 10 and 11) is connected to an air supply line 69 and the passage of air into the valve through this line is regulated by a throttle 70 of the adjustable needle type. The valve 68 is provided with an air-exhaust throttle 71 which is also regulated by a threaded needle. The valve includes a piston 72 which is normally in a lower position where it cuts off the supply of air to the line 67 and the cylinder 65a and connects the line 67 and the right hand end of the cylinder 65a to the exhaust throttle 71. When the solenoid of the valve 68 is energized, the piston 72 is lifted and connects the air supply line 69 to the line 67 and cylinder 65a and cuts off communication of the line 67 with the exhaust throttle 71.

Figure 10:
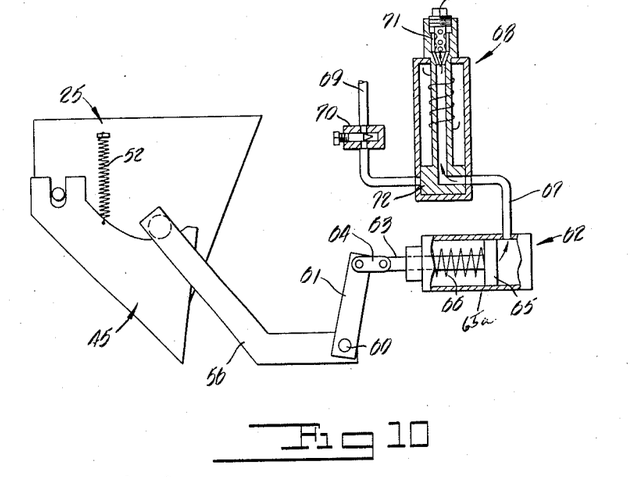
Figure 10 is a schematic view illustrating the control of the gate and operating mechanism of Figures 1 to 6, the gate being shown in closed position.
Figure 11:
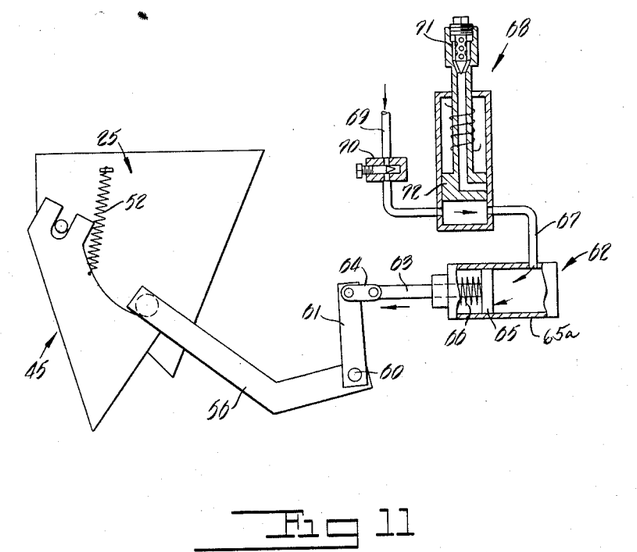
Figure 11 is a view similar to Figure 10 but showing the gate in open or dumping position.

With this arrangement of air cylinder and air valve for controlling the opening and closing of the gate 45, precise control over the gate is accomplished. As shown in Figure 10, before the valve 68 is operated by a proper supply of electric current thereto, the gate 45 is in closed position and as previously indicated, the cam rollers are not in engagement therewith. However, as soon as the valve 68 is actuated, the piston 65 is moved to the left and the arm 61 is rocked to the left about the axis of the shaft 60. This causes the outer ends of the arms 56 and 57 to swing downwardly causing the cam rollers 58 and 59 to respectively engage the cam-edges 53 and 54 of the gate 45 and swing the gate downwardly against the force of the springs 52, thereby discharging the contents of the bucket 25 which has been previously weighed. The air cylinder and piston unit 62 will operate to swing the arms 56 and 57 smoothly without shock and the movement of the piston 65 in both directions can be adjusted at will by means of the throttles 70 and 71. By adjusting the inlet throttle 70 and the speed of opening of the gate can be adjusted whereas by adjusting the exhaust throttle 71 the speed of opening of the gate can be adjusted. As indicated, movement of the piston 65 in the gate closing direction will be produced by the spring 66 when the valve 68 again closes. It will be noted that the pivots for the gate 45 are in the same plane as the pivots for the outrider 34 which further minimizes stresses on the bearings of the scale.

Figure 7:
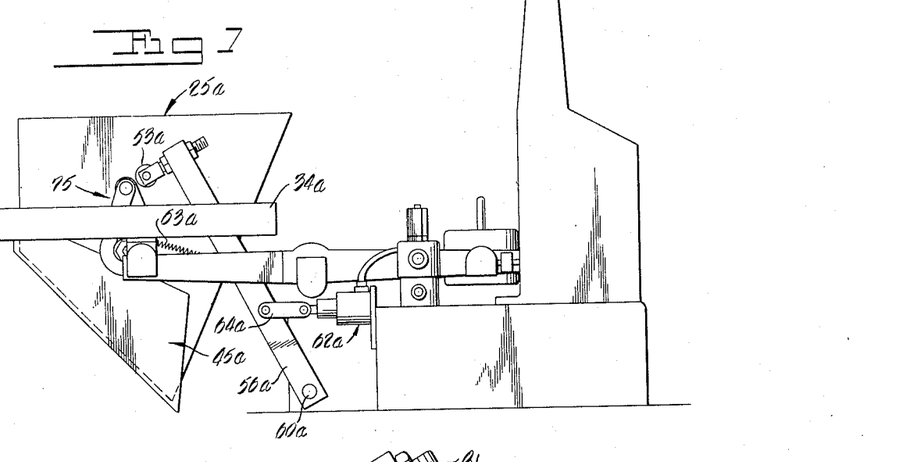
Figure 7 is a side elevational view illustrating a different type of gate and operating mechanism.
Figures 8, 9:
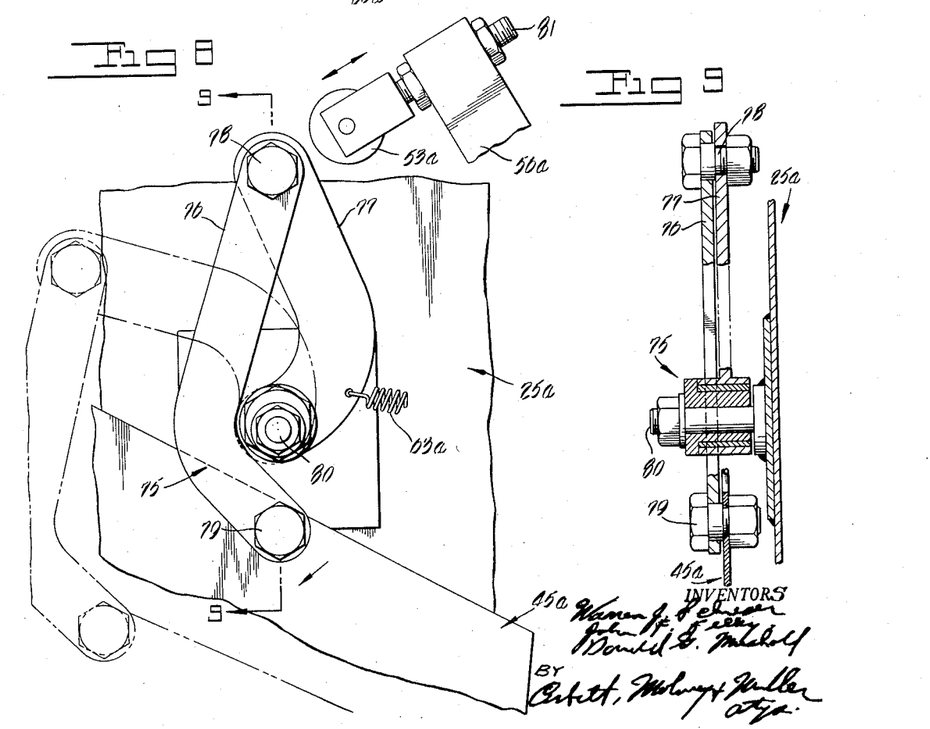
Figure 8 is a detail in side elevation of the gate structure and operating mechanism of Figure 7.
Figure 9 is a vertical sectional view taken along 9—9 of Figure 8.

In Figures 7 and 8, we have illustrated different operating mechanism for the bucket gate. The bucket is illustrated at 25a and the gate at 45a. The gate is mounted on the bucket exactly as before and a yielding lock arrangement is provided for supporting the weight of the contents of the bucket 25a which is an off-center or toggle lock that is indicated generally by the numeral 75.

This toggle lock arrangement is provided on both sides of the bucket 25a and, as shown best in Figures 8 and 9, comprises a longer arm 76 and a shorter arm 77 which are flat and are pivoted together at one of their ends as indicated at 78. The longer arm 76 has its lower end turned inwardly and is pivoted to the associated upstanding side of the gate 45a at 79. The lower end of the arm 77 is turned outwardly and is pivoted at 80 to the associated wall of the bucket 25a at a level slightly above the pivot 79. The pivots 78, 79, and 80 are substantially in alignment when the gate 45a is closed but the pivot 78 is slightly beyond the pivot center line to the right so that the locking arrangement will act similar to a toggle or off-center lock tending to keep the gate up in closed position against the force exerted by the material in the weigh-bucket resting on the gate 45a. A spring 63a is connected to each arm 77 and to the bucket 25a and tends to pull the lock 75 to the right to an off-center position.

For releasing the locks 75 and opening the gate 45a, a pair of operating arms 56a are provided. These arms extend upwardly along each side of the bucket 25a between the sides of the bucket and the outrider 34a. They carry cam-rollers 53a which are adapted to engage the adjacent ends of arms 76 and 77 of the locks 75 at the pivots 78. The rollers 53a are carried adjustably by bolts 81 on the upper ends of the arms 56a so that they may be accurately positioned relative to the locks 75. The lower ends of the arms are keyed on a shaft 60a at the base of the scale and the arms are swung about the axis of this shaft by means of a cylinder and piston unit 62a which is connected to one of the arms 56a intermediate its height by means of the link 64a. With the cylinder and piston unit 62a in its normal position, the rollers 53a are not in contact with the locks 75 and the required vertical movement of the bucket 25a during weighing can occur without interference. Therefore, in this instance also, the operating arms 56a are carried by fixed elements of the scale and do not contact any moving elements thereof during the weighing operation.

Figure 12:
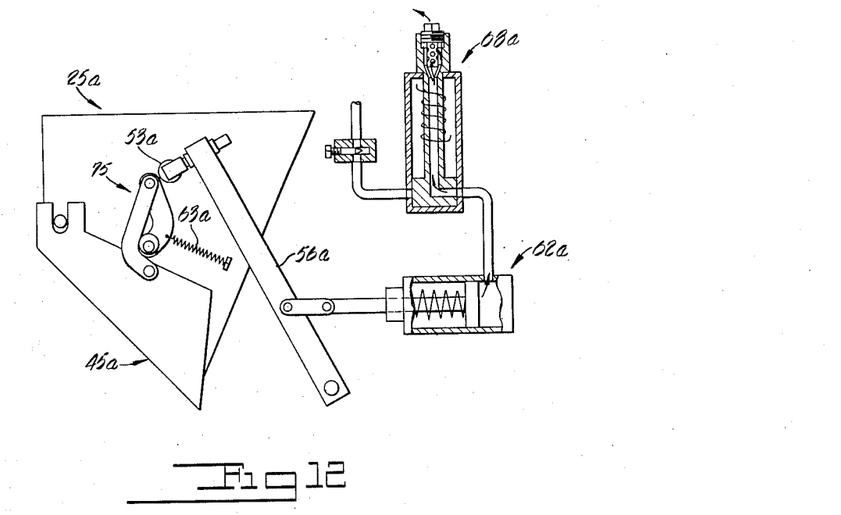
Figure 12 is a schematic view illustrating the control of the gate and operating mechanism of the type shown in Figures 7 to 9, the gate being shown in closed position.
Figure 13:
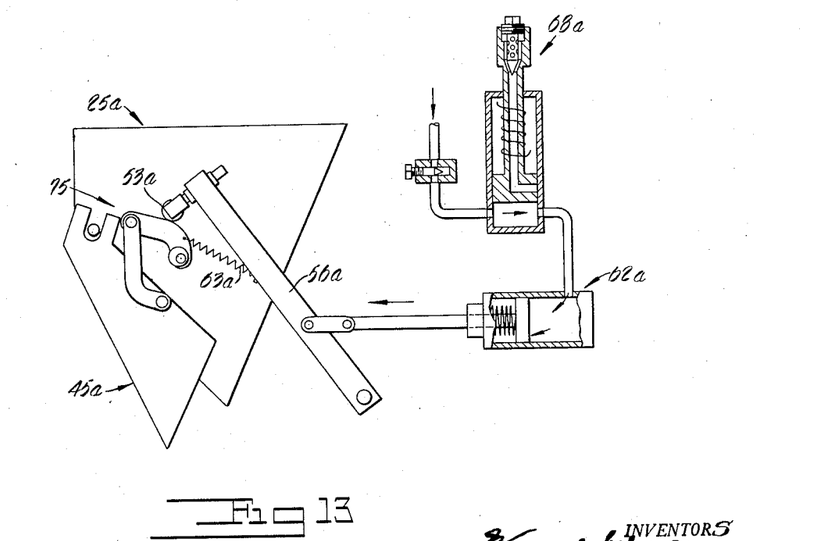
Figure 13 is a view similar to Figure 12 but showing the gate in open or dump position.

As indicated in Figure 12, the cylinder and piston unit 62a will normally keep the arms 56a out of contact with the locks 75 whch will be off-center and will be holding the gate 45a closed. However, as soon as air is supplied by the valve 68a to the unit 62a, as shown in Figure 13, the unit 62a will swing the arms 56a to the left causing the cam-rollers 53a to engage the locks 75 and force them to the left. When each lock 75 is moved to the left beyond the pivot center line, the weight of the contents of the bucket 25a will overcome the resistance of the springs 63a and therefore the gate 45a will swing open. As soon as the valve 68a again closes, as shown in Figure 12, the arms 56a will move back and the gate will be closed by the force exerted by the springs 63a returning the locks 75 to their off-center position to the right of the pivot center line as shown in Figure 12.

Figure 14:
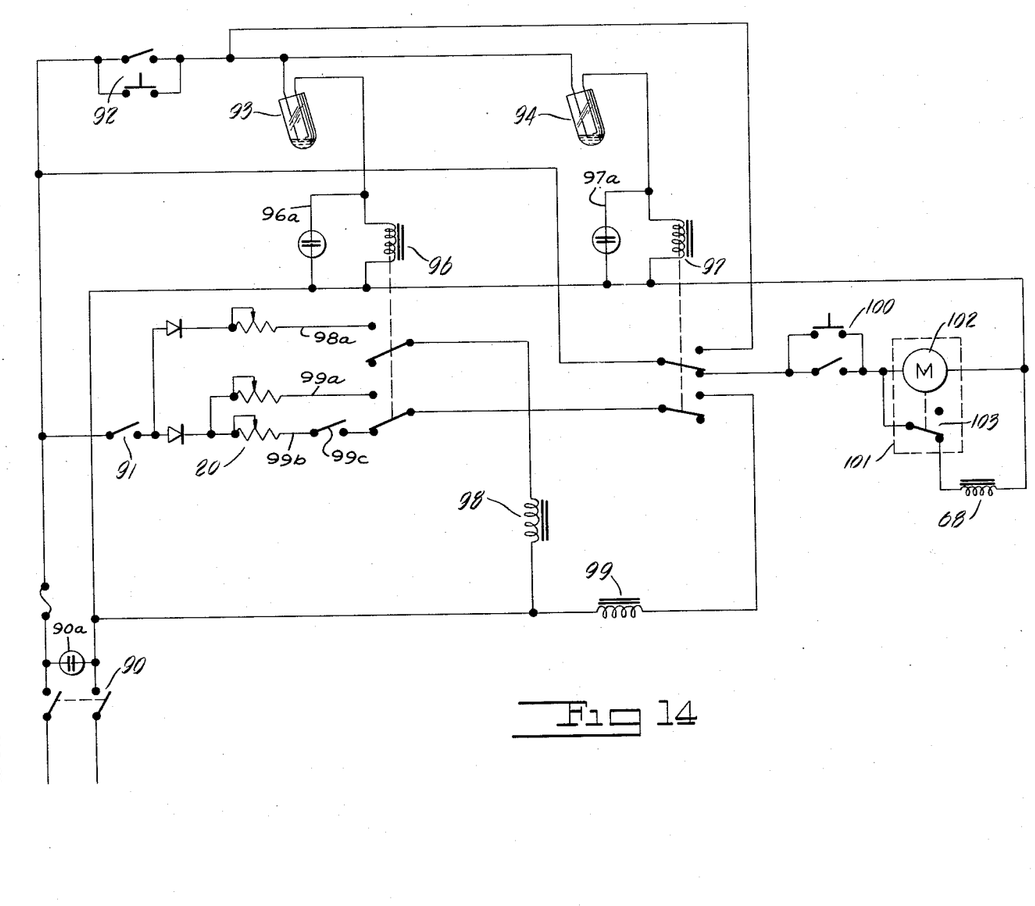
Figure 14 is a circuit diagram illustrating a circuit that can be used in controlling a net-weigher having either the gate operating mechanism of Figures 1 to 6 or that of Figures 7 to 9.

In Figure 14, we have illustrated a circuit which can be used in controlling a net-weigher and associated feeder of the type described above. The circuit for the feeder and the net-weigher have been illustrated for a complete understanding of the operation of our machine but will not be described in detail except as to those portions which control the electro-magnetically operated valve that controls the gate as described above. This valve is indicated in the circuit as being the valve 68 but it is to be understood that it could also be the valve 68a.

Figure 2:
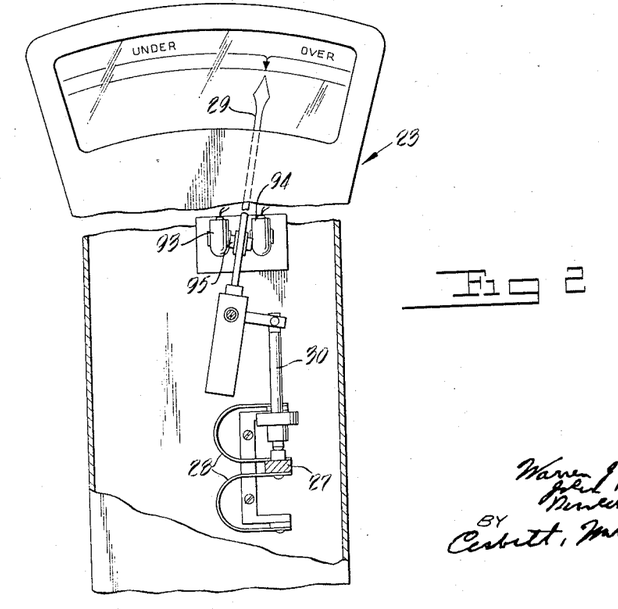
Figure 2 is a view, mainly in vertical section, of the indicator tower of the net-weigher, the view being taken along line 2—2 of Figure 1.

The circuit includes a main switch 90, a feeder switch 91, and a fill switch 92 which may be set for manual or automatic operation. The switch 92 controls a fast-feed mercury magnetic switch 93 and a slow feed mercury magnetic switch 94. These switches 93 and 94 are disposed in the indicator tower 23, as shown in Figure 2, and are under the control of a magnet 95 carried by the indicator pointer 29. The switch 93 is closed at the initial underweight position of the pointer 29 and will open at the end of the fast-feed. The switch 94 is closed at the underweight position but will open at the balanced or exact weight position. The switch 93 controls a fast-feed relay 96 and the switch 94 controls a slow feed relay 97. Both of these relays control vibrator coils 98 and 99 which actuate the vibrator feeder 20. The relay 97 controls a circuit to the coil of the electromagnetic valve 68. Connected in the circuit with the coils of the relays 96 and 97 are branch indicator circuits 96a and 97a which indicate when the respective relay coils are energized. The circuit also includes a rheostat circuit 98a which controls the indicator coil 98. The controls for the vibratory feeder 20 also include a fast feed rheostat circuit 99a and a slow feed rheostat circuit 99b, the latter also including a manual switch 99c. An on-off indicator circuit 90a is connected in the circuit in association with the main switch 90.

The circuit for the valve 68 comprises a switch 100 which can be set for manual or automatic operation. This switch controls a time-delay timer indicated at 101 which includes a synchronous motor 102 that actuates a switch 103. Thus, de-energizing of the relay 97 energizes the timer 101 and the valve 68, and after a predetermined delay, the motor 102 actuates the switch 103 and de-energizes the valve 68. Consequently, the weigh-bucket is held open for a predetermined period which will give sufficient time to allow complete discharge of the contents of the bucket.

It will be apparent from the above description that we have provided a net-weigher which is so designed that minimum shock is imparted to the scale during the feeding, weighing and dumping operations. The gate-operating mechanism is not carried by movable elements of the scale and only engages movable elements during the dumping operation so as not to interfere with the accuracy of the weighing operation. The opening and closing of the gate is accomplished with a fluid-actuated unit, preferably pneumatic, which is smooth in operation so as to reduce shock, and which can be controlled as to speed in both directions, that is gate-opening and gate-closing.

Various other advantages will be apparent.

Having thus described our invention, what we claim is:

1. A net-weigher comprising a weighing lever fulcrumed for balancing movement, a bucket carried by said lever at all times for receiving material to be weighed, means for discharging the contents of the bucket and comprising a dump gate movable relative to the bucket from normally closed position to open dumping position, said gate being of scoop form and straddling the lower end of the bucket, means for moving said gate between its two positions and comprising mechanical means supported independently of the weighing lever, the bucket and the gate during the weighing operation but being movable into engagement with the gate to open it after the weighing operation is completed, and control means for moving said mechanical means, said gate being provided with an off-center lock tending to keep it closed, a spring tending to keep said lock in off-center locking position, said mechanical means comprising an actuating arm for engaging said lock and moving it to unlocking position to permit opening of the gate, a pair of said locks being provided on opposite sides of the bucket, each of said locks comprising a pair of arms of toggle type pivoted together on a common pivot, one arm being pivoted to the gate by a second pivot and the other arm being pivoted to the bucket by a third pivot, the second and third pivots being substantially in alignment when the gate is closed but the common pivot being slightly off-center to aid in keeping the gate closed, a pair of said actuating arms being provided for engaging said locks.

2. A net-weigher according to claim 1 in which each of said actuating arms is provided with a roller for engaging said lock which is adjustably mounted on the arm.

3. A net-weigher comprising a weighing lever fulcrumed for balancing movement, a bucket carried by said lever at all times for receiving material to be weighed, means for discharging the contents of the bucket and comprising a dump gate movable relative to the bucket from normally closed position to open dumping position, means for moving said gate between its two positions and comprising mechanical means supported independently of the weighing lever, the bucket and the gate during the weighing operation but being movable into engagement with the gate to open it after the weighing operation is completed, control means for moving said mechanical means, said control means comprising a fluid-actuated unit, and means for controlling said unit including means for controlling the speed of operation of said unit, said unit being a cylinder and piston unit and said controlling means comprising an electromagnetically operated valve and the speed controlling means comprises fluid-throttling means operatively connected with said valve.

4. A net-weigher according to claim 3 in which said fluid-actuated cylinder and piston unit comprises a piston movable in a gate-opening direction by fluid pressure and in a gate-closing direction by spring pressure, said valve controlling the supply of pressure to and exhaust of pressure from said unit, said valve being provided with a pressure-supply throttle and an exhaust throttle.

5. A net-weigher comprising a weighing lever fulcrumed for balancing movement, a bucket carried by said lever at all times for receiving material to be weighed, means for discharging the contents of the bucket and comprising a dump gate movable relative to the bucket from normally closed position to open dumping position, said gate being of scoop form and straddling the lower end of the bucket, means for moving said gate between its two positions and comprising mechanical means supported independently of the weighing lever but being movable into cooperation with the gate to open it after the weighing operation is completed, said gate being provided with springs for returning it to closed position, said mechanical means comprising a pair of arms on opposite sides of the bucket having means for engaging the upper edges of the scoop, said engaging means being cam rollers which engage cam portions on the edges of the scoop, said rollers being out of contact with said edges during the weighing operation, and control means for moving said mechanical means.

6. A net-weigher comprising a weighing lever fulcrumed for balancing movement, an outrider carried by pivots on said lever, a bucket carried by said outrider, said lever and said outrider being of open form so that the bucket extends downwardly therethrough, means for discharging the contents of the bucket and comprising a dump gate carried by pivots on the bucket for movement relative thereto from normally closed position to open dumping position, said pivots for the outrider and said pivots for the gate being in the same plane, means for moving said gate between its two positions and comprising mechanical means supported independently of the weighing lever, the bucket and the gate during the weighing operation, but being movable into cooperation with the gate to open it after the weighing operation is completed, and control means for moving said mechanical means.

References Cited in the file of this patent
UNITED STATES PATENTS

| | | |
|---|---|---|
| 2,097,522 | Hanique | Nov. 2, 1937 |
| 2,364,902 | Howard | Dec. 12, 1944 |
| 2,549,704 | Noble | Apr. 17, 1951 |
| 2,579,708 | Smith et al. | Dec. 25, 1951 |
| 2,634,082 | Knobel | Apr. 7, 1953 |
| 2,678,185 | Howard | May 11, 1954 |
| 2,726,061 | Schieser et al. | Dec. 6, 1955 |
| 2,760,232 | Rougemont et al. | Aug. 28, 1956 |
| 2,763,457 | Gregory | Sept. 18, 1956 |